US011451479B2

(12) United States Patent
Hatta et al.

(10) Patent No.: US 11,451,479 B2
(45) Date of Patent: Sep. 20, 2022

(54) NETWORK LOAD DISTRIBUTION DEVICE AND METHOD

(71) Applicant: Nippon Telegraph and Telephone Corporation, Tokyo (JP)

(72) Inventors: Saki Hatta, Tokyo (JP); Shoko Oteru, Tokyo (JP); Tomoaki Kawamura, Tokyo (JP); Koji Yamazaki, Tokyo (JP); Takahiro Hatano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 18 days.

(21) Appl. No.: 17/258,359

(22) PCT Filed: Jul. 5, 2019

(86) PCT No.: PCT/JP2019/026815
§ 371 (c)(1),
(2) Date: Feb. 18, 2021

(87) PCT Pub. No.: WO2020/013094
PCT Pub. Date: Jan. 16, 2020

(65) Prior Publication Data
US 2021/0281516 A1 Sep. 9, 2021

(30) Foreign Application Priority Data
Jul. 9, 2018 (JP) .............................. JP2018-129759

(51) Int. Cl.
*H04L 47/125* (2022.01)
*H04L 45/7453* (2022.01)

(52) U.S. Cl.
CPC ........ *H04L 47/125* (2013.01); *H04L 45/7453* (2013.01)

(58) Field of Classification Search
CPC .............. H04L 47/125; H04L 45/7453; H04L 43/0888; H04L 47/2433; H04L 41/0823; H04L 67/1023
See application file for complete search history.

(56) References Cited

U.S. PATENT DOCUMENTS 8,854,972 B1 * 10/2014 Li ........................... H04L 47/12
370/235
10,320,568 B1 * 6/2019 Mao ...................... H04L 9/0894
(Continued)

FOREIGN PATENT DOCUMENTS

JP 2017139597 A 8/2017

OTHER PUBLICATIONS

Fumihiko Sawazaki et al., "A study about SPP design with countermeasure of data buffer overflow," NetroSphere: Towards the Transformation of Carrier Networks, , IEICE, 2018, 7 pages.
(Continued)

*Primary Examiner* — Donald L Mills
(74) *Attorney, Agent, or Firm* — Slater Matsil, LLP

(57) ABSTRACT

A network load balancing apparatus has a data buffer provided to each communication path of transfer destinations of a received packet and being associated with a virtual function, determines a destination virtual function based on a field value of the received packet, determines a communication path of a transfer destination of a packet to be subject to priority control based on a first hash value calculated using the field value, determines a communication path of a transfer destination of a packet to be subject to load balancing control, to match a preset load balancing situation of the data buffer, based on a second hash value based on the first hash value, and transmits the packet to a data buffer corresponding to the destination virtual function and the communication path of the transfer destination.

8 Claims, 6 Drawing Sheets

(56) References Cited

U.S. PATENT DOCUMENTS

2017/0034049 A1* 2/2017 Pfaff ..................... H04L 45/38
2019/0386913 A1* 12/2019 Wei ...................... H04L 47/30

OTHER PUBLICATIONS

Intel, "Intel Ethernet® Controller X710/XXV710/XL710 Datasheet," Ethernet Networking Division (ND), Feb. 2018, 1708 pages.

* cited by examiner

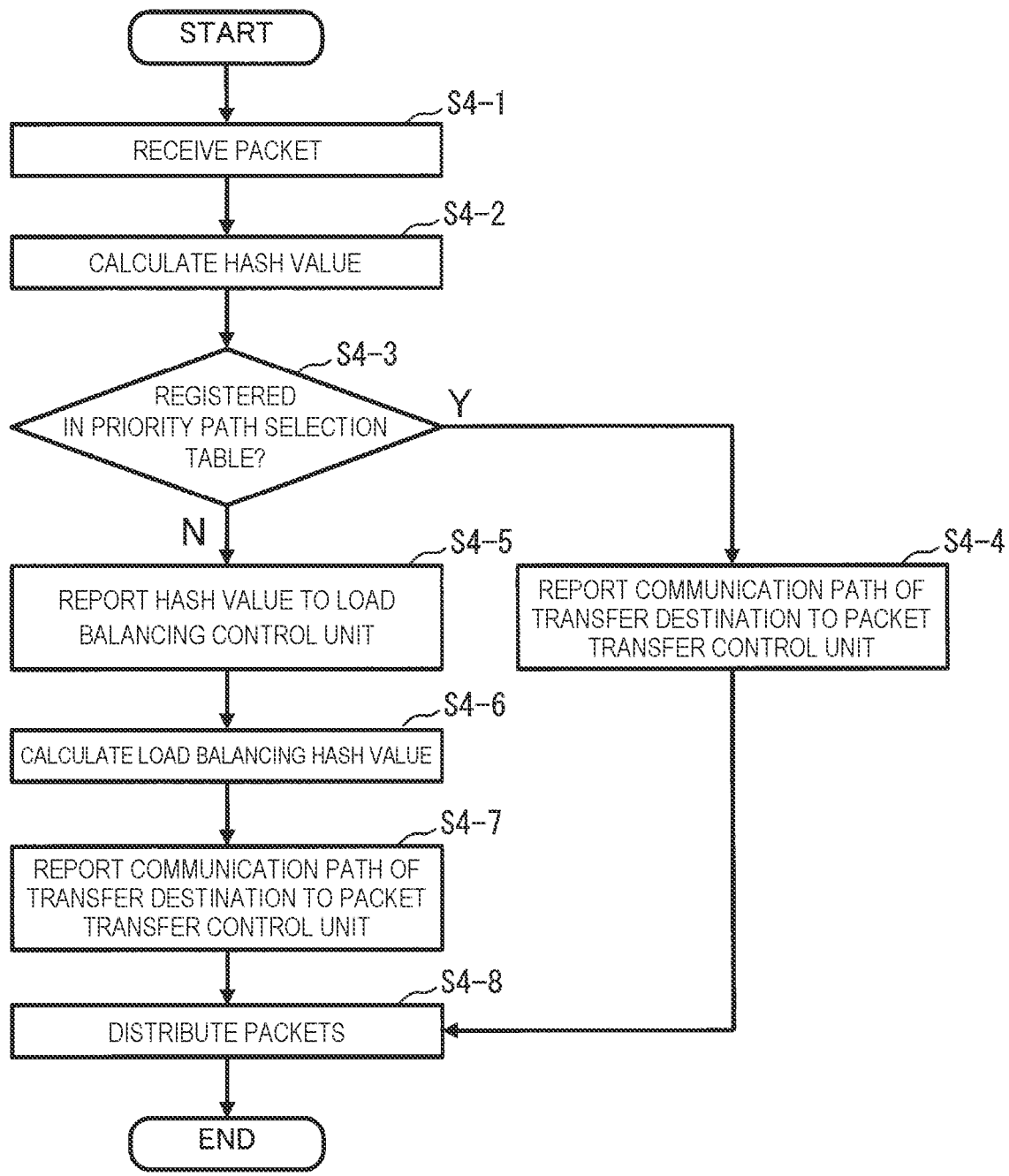

NETWORK LOAD DISTRIBUTION DEVICE AND METHOD

CROSS-REFERENCE TO RELATED APPLICATIONS

This patent application is a national phase filing under section 371 of PCT/JP2019/26815, filed Jul. 5, 2019, which claims the priority of Japanese patent application 2018-129759, filed Jul. 9, 2018, each of which is incorporated herein by reference in its entirety.

TECHNICAL FIELD

The present invention relates to an apparatus for controlling destinations of packets, and particularly relates to a network load balancing apparatus and method that allows for distribution to several virtual machines (VMs), while ensuring quality of service (QoS) and realizing an improvement in throughput performance, by comprehensively incorporating priority control, load balancing, and distribution of specific packets to a plurality of VMs in a communication server assistance apparatus.

BACKGROUND

Normally, a network configured based on Software-Defined Networking (SDN)/Network Function Virtualization (NFV) is made up of several general-purpose servers. A plurality of virtual machines (VMs) may be constructed in a general-purpose server and be used to process one application, or each VM may be used to process a plurality of applications.

Virtualized communication application software that runs on VMs in this way are known as Virtual Network Functions (VNFs). Since various VNFs can be run on a single general-purpose server, CAPEX/OPEX can be reduced compared to a conventional network configuration using dedicated apparatuses. Even among load balancing apparatuses which were generally configured by conventional dedicated hardware, apparatuses with more flexible configurations utilizing VNFs are known.

Meanwhile, as a packet transmission/reception interface of the general-purpose server, a general-purpose network adapter (Network Interface Card: NIC) is installed. In the general NIC disclosed in Non-patent Literature 1, received packets are accumulated in a data buffer, and are stored in a main memory in the server using Direct Memory Access (DMA) transfer.

Because the control method for distributing packets to the data buffer in the NIC is greatly affected by packet transfer performance and the functionalities that can be realized by the server system as a whole, the number of data buffers and the control method for distributing packets to multiple data buffers differ depending on the NIC. For example, by including a plurality of data buffers and performing load balancing control with respect to received packets, a plurality of CPU cores can perform the load balancing process to improve the throughput. In addition, by performing priority control of received packets occupying one data buffer and having a flow, packet reordering in the flow can be prevented.

In addition, in load balancing apparatuses with a configuration of a general-purpose server, a general-purpose NIC and VNFs, the predominant configuration is one wherein communication bottlenecks with the CPU are reduced using the I/O virtualization function Single-Root I/O Virtualization (SR-IOV) of the hardware of a general NIC mentioned above. However, in conventional load balancing apparatuses, since distribution of a large quantity of packets to a plurality of servers is processed by the VNFs, there is a problem in that significant packet discarding occurs when the traffic to be distributed exceeds a certain quantity, even if SR-IOV is used. This may limit the maximum amount of traffic that can be passed by the VNFs in advance.

In order to solve the above problem, apparatuses have been proposed which reduce CPU load by efficiently distributing received packets. For example, Patent Literature 1 realizes a packet distribution method in which both load balancing control and priority control of received packets are achieved. FIGS. 5 and 6 show a configuration example and an operation example of a network load balancing apparatus of Patent Literature 1.

In Patent Literature 1, priority control is realized by calculating a hash value with respect to a specific region of a received packet, comparing the calculated hash value with a hash value registered in a priority path selection table, and if the values match, transferring the received packet to a data buffer (S4-1 to S4-4) registered in the priority path selection table. On the other hand, if the calculated hash value does not match the hash value registered in the priority path selection table, the hash value is reported to a load balancing control unit 30, and the packet is transferred to a data buffer registered in a load balancing path selection table while being subjected to load balancing (S4-5 to S4-8).

CITATION LIST

Patent Literature

Patent Literature 1: Japanese Patent Laid-Open No. 2017-139597.

Non-Patent Literature

Non-Patent Literature 1: "Intel Ethernet® Controller XL710 Datasheet", 2015 <http://www.intel.com/content/dam/www/public/us/en/documents/datasheets/xl710-10-40-controller-datasheet.pdf>.

SUMMARY

Technical Problem

However, since the network load balancing apparatus of Patent Literature 1 does not have a configuration in which packets are transmitted with consideration to the destination VM when transmitting packets from the NIC to each of a plurality of VMs, there is a need for a software-implemented bridge function that distributes the received packets to each VM. When a bridge function is implemented in software, there is a problem in that the throughput decreases as the number of VMs increases. Further, when distribution to each VM in the network load balancing apparatus of Patent Literature 1 is performed by software, it is not possible to change the control method of priority distribution or load balancing distribution for each VM. This is because the control functions for priority distribution are provided to the NIC and the control functions for distribution to the VMs are provided to software, so that the functions are provided completely separate from each other.

If it were possible to change the distribution control method for each application when a different application is executed by each of a plurality of VMs, flexible server operation would be possible. For example, if it were possible to enable the use of a VM set up for priority control in the case of an application that prioritizes flow, such as image processing, and VMs set up for load balancing control in the case of other applications, it would be possible to realize high functionality and high throughput of the system as a whole. However, if it is not possible to change the distribution control method for each application, high functionality and high throughput of the system as a whole cannot be expected.

Embodiments of the present invention were made in order to solve the above problem, and have an object of providing a network load balancing apparatus that allows for changing of the distribution control method of packets to each of a plurality of VMs while maintaining a high throughput of the VNFs, to realize high functionality and high throughput of the system as a whole.

Means for Solving the Problem

In order to solve the above problem, a network load balancing apparatus according to embodiments of the present invention includes a data buffer provided to each communication path of transfer destinations of a received packet and being associated with a virtual function; a function transfer control unit that determines a destination virtual function based on a field value of the received packet or a hash value calculated using the field value; a hash value calculation unit that calculates a first hash value using the field value; a priority control unit that determines a communication path of a transfer destination of a packet to be subject to priority control based on the first hash value; a load balancing control unit that determines a communication path of a transfer destination of a packet to be subject to load balancing control, to match a preset load balancing situation of the data buffer, based on the first hash value or a second hash value based on the first hash value; and a packet transfer control unit that, in accordance with the destination virtual function determined by the function transfer control unit and the communication path of the transfer destination determined by at least one of the priority control unit and the load balancing control unit, transmits the packet to a data buffer corresponding to the destination virtual function and the communication path of the transfer destination.

In addition, the function transfer control unit may include a destination function selection table storing in advance, for each of the virtual functions, a field value of the destination virtual function or a hash value calculated using the field value; and a destination function control unit that, for each of the virtual functions, checks the field value of the received packet against the field value of the destination function selection table, or checks the hash value calculated using the field value of the received packet against the hash value of the destination function selection table, and determines the destination virtual function according to a result of the check.

In addition, the function transfer control unit may determine all the virtual functions as the destination virtual function in case the field value of the received packet or the hash value calculated using the field value is a value corresponding to a preset specific broadcast address.

In addition, the function transfer control unit may determine, for each of the virtual functions, whether a promiscuous mode is set, and determines the virtual functions where the promiscuous mode is set as the destination virtual functions to which all packets are to be transferred.

In order to solve the above problem, a network load balancing method according to embodiments of the present invention is a network load balancing method that controls transfer to data buffers provided to each communication path of transfer destinations of received packets and being associated with virtual functions, the method including: a function transfer control step of determining a destination virtual function based on a field value contained in the received packet or a hash value calculated using the field value; a hash value calculation step of calculating a first hash value using the field value; a priority control step of determining a communication path of a transfer destination of a packet to be subject to priority control based on the first hash value; a load balancing control step of determining a communication path of a transfer destination of a packet to be subject to load balancing control, to match a preset load balancing situation of the data buffer, based on the first hash value or a second hash value based on the first hash value; and a packet transfer control step of, in accordance with the destination virtual function determined in the function transfer control step and the communication path of the transfer destination determined in at least one of the priority control step and the load balancing control step, transmitting the packet to a data buffer corresponding to the destination virtual function and the communication path of the transfer destination.

In addition, the function transfer control step may include a step of checking a destination function selection table storing in advance, for each of the virtual functions, a field value of the destination virtual function or a hash value calculated using the field value; and a step of checking, for each of the virtual functions, the field value of the received packet against the field value of the destination function selection table, or checking the hash value calculated using the field value of the received packet against the hash value of the destination function selection table, and determining the destination virtual function according to a result of the check.

In addition, the function transfer control step may determine all the virtual functions as the destination virtual function in case the field value of the received packet or the hash value calculated using the field value is a value corresponding to a preset specific broadcast address.

In addition, the function transfer control step may determine, for each of the virtual functions, whether a promiscuous mode is set, and determine the virtual functions where the promiscuous mode is set as the destination virtual functions to which all packets are to be transferred.

Effects of Embodiments of the Invention

According to embodiments of the present invention, a network load balancing apparatus can be provided that allows for changing of the distribution control method of packets to each of a plurality of VMs while maintaining a high throughput of the VNFs, to realize high functionality and high throughput of the system as a whole.

BRIEF DESCRIPTION OF THE DRAWINGS

FIG. 6 is a flowchart showing an operation example of a conventional network load balancing apparatus.

DETAILED DESCRIPTION OF ILLUSTRATIVE EMBODIMENTS

An embodiment of the present invention is described below with reference to the drawings. The present invention can be implemented in various embodiments and is not limited to the embodiments shown below.

<Network Load Balancing Apparatus>

Figure 1:
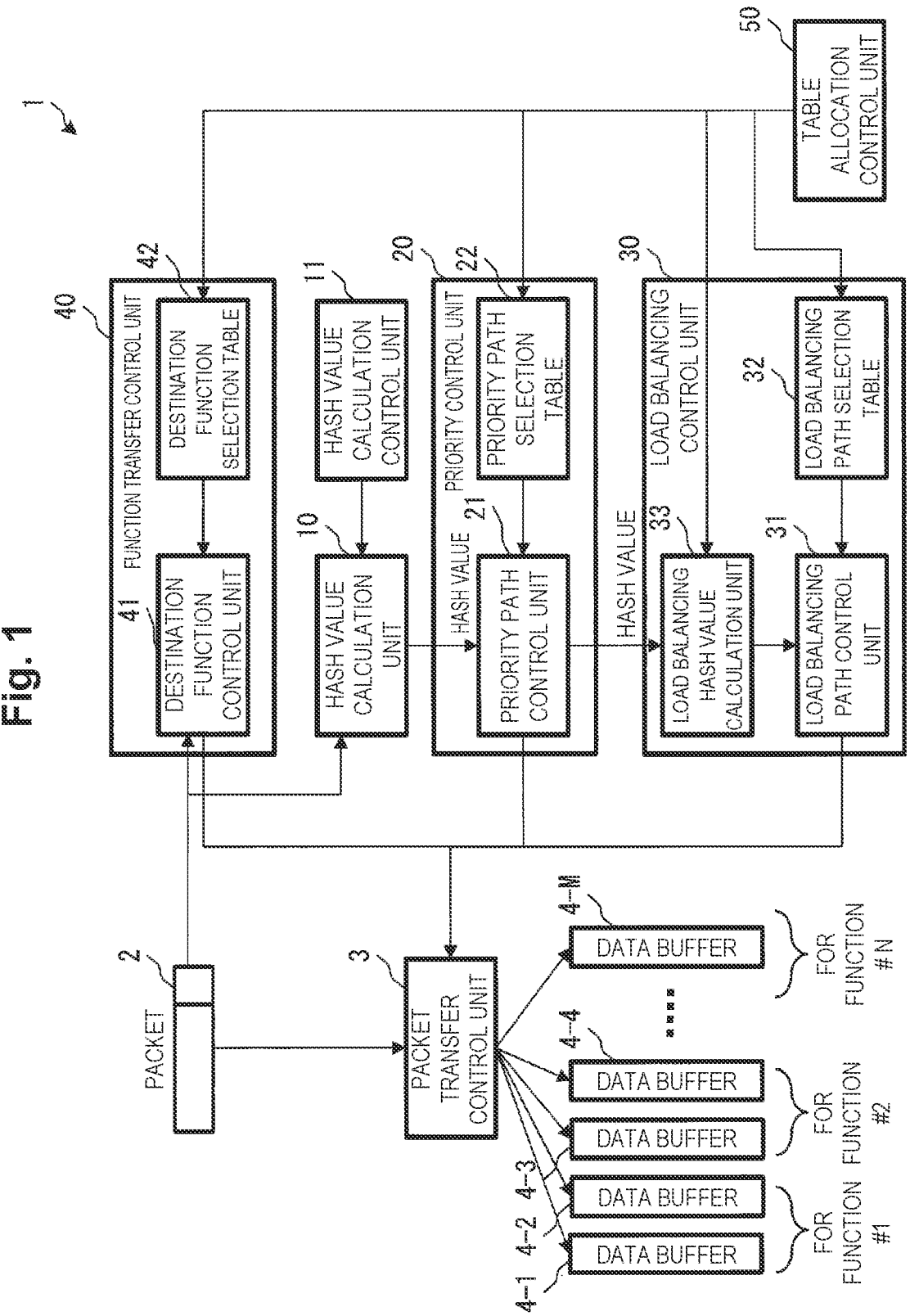
FIG. 1 is a block diagram showing a configuration example of a network load balancing apparatus according to an embodiment of the present invention.

FIG. 1 is a block diagram showing a configuration example of a network load balancing apparatus according to an embodiment of the present invention. The network load balancing apparatus according to embodiments of the present invention is envisaged to be used at a packet receiving end, and data in the form of packets is input into the network load balancing apparatus. A packet generally has, as header data, additional data representing the attributes of the packet, such as the packet field value etc.

The network load balancing apparatus 1 includes a function transfer control unit 40, a hash value calculation unit 10, a hash value calculation control unit 11, a priority control unit 20, a load balancing control unit 30, data buffers (4-1 to 4-M), a table allocation control unit 50, and a packet transfer control unit 3. It differs from a conventional configuration in that it includes the function transfer control unit 40.

The network load balancing apparatus 1 can be realized using a device such as a field-programmable gate array (FPGA) or application-specific integrated circuit (ASIC) and a program running on the device or circuit data of the device. In the case of a program, a processor of the device executes a process according to a program stored in a memory to function as a network load balancing apparatus. In addition, the network load balancing apparatus 1 may also be realized using a program on an apparatus such as a commonly used switch or router, or a virtual switch on a general-purpose server.

<Function Transfer Control Unit>

The function transfer control unit 40 is a block for determining to which VNF a received packet 2 is to be transferred. In the function transfer control unit 40, a destination virtual function of the received packet is determined.

Here, the VMs and VNFs built on the server are to be associated with one another in the OS. For example, one VNF may be allocated to one VM, or a plurality of VNFs may be allocated to one VM. Further, in the configuration example of FIG. 1, two data buffers are associated with each function, but the invention is not so limited. One data buffer may be allocated to one function, or three or more data buffers may be associated with one function.

The function transfer control unit 40 is composed of a destination function control unit 41 and a destination function selection table 42. The destination function control unit 41 extracts a destination MAC address which is the field value contained in the received packet 2. Numerical information indicating packet transfer/non-transfer (ON/OFF) and a MAC address of a destination virtual function are associated with each other and stored in advance in the destination function table 42. The destination function selection table may be set in advance from the outside via the table allocation control unit 50.

The destination function control unit 41, upon receiving the packet 2, extracts a destination MAC address contained in the received packet 2, and checks whether the extracted destination MAC address matches the MAC address registered in the destination function selection table. Further, in case the MAC addresses match, the destination function control unit 41 reports the function number to the packet transfer control unit 3 to transfer the received packet 2 to the corresponding virtual function. The destination function control unit 41 repeats this destination function process for each virtual function (function number=0 to N) to search for a function number corresponding to the destination MAC address, and notifies the packet transfer control unit 3.

<Hash Value Calculation Unit>

Upon receipt of the packet 2, the hash value calculation unit 10 of the network load balancing apparatus 1 acquires a field value at a predetermined location in the header data of the received packet 2, and calculates a unique hash value of the attributes of the packet from the acquired field value and a preset key value. The calculated hash value is reported to the priority control unit 20 etc.

Here, the location of the field value to be acquired in the header data of the packet 2 is preset in the hash value calculation unit 10 from the outside via the hash value calculation control unit 11. Likewise, the key value may also be preset from the outside via the hash value calculation control unit 11.

If the location of the field value in the header data to be acquired can be designated from the outside, a packet identification process can be realized with respect to any field value of any length, rather than the fixed field value as disclosed in Non-Patent Literature 1. In addition, it is also possible to handle special conditions, such as acquiring field values from a plurality of fields, which ensures scalability in the future.

<Priority Control Unit>

The priority control unit 20 is composed of a priority path control unit 21 and a priority path selection table 22. A value that can be the hash value calculated by the hash value calculation unit 10 for each virtual function and communication paths of destinations are associated with each other and stored in advance in the priority path selection table 22 of the priority control unit 20. The contents of the priority path selection table are preset via the table allocation control unit 50.

The priority path control unit 21 of the priority control unit 20 checks the hash value (first hash value) calculated by the hash value calculation unit 10 against the priority path selection table 22. If a value identical to the hash value calculated by the hash value calculation unit 10 is registered in the priority path selection table 22, the priority path control unit 21 of the priority control unit 20 acquires information of a communication path of a destination corresponding to this hash value from the priority path selection table 22 and reports the information of the communication path of the destination to the packet transfer control unit 3. On the other hand, if a value identical to the hash value calculated by the hash value calculation unit 10 is not registered in the priority path selection table 22, the hash value calculated by the hash value calculation unit 10 is reported to the load balancing control unit 30.

<Load Balancing Control Unit>

The load balancing control unit 30 is composed of a load balancing path control unit 31, a load balancing path selection table 32, and a load balancing hash value calculation unit 33. A value that can be a hash value calculated by the load balancing hash value calculation unit 33 for each virtual function and communication paths of destinations are associated with each other and stored in advance in the load balancing path selection table 32 of the load balancing control unit 30.

The load balancing hash value calculation unit 33 of the load balancing control unit 30 calculates a hash value (second hash value) used in a load balancing process from the hash value calculated by the hash value calculation unit 10 and information of specific destinations usable in load balancing control. Specifically, for example, the hash value calculated by the hash value calculation unit 10 may be divided by the number of communication paths of destinations usable in load balance control (for each virtual function, the total number of data buffers minus the number of data buffers used in priority control).

The hash value calculated by the hash value calculation unit 10 is a value unique to the attribute of a packet. On the other hand, since the hash value calculated by the load balancing hash value calculation unit 33 is not necessarily a value unique to the attribute of a packet, there may be a case in which identical hash values are calculated for different packet attributes.

The load balancing path control unit 31 of the load balancing control unit 30 checks the hash value calculated by the load balancing hash value calculation unit 33 against the load balancing path selection table 32, acquires information of a communication path of a destination corresponding to the hash value calculated by the load balancing hash value calculation unit 33 from the load balancing path selection table 32, and notifies the packet transfer control unit 3.

<Packet Transfer Control Unit>

In accordance with the transfer destination function number determined by the function transfer control unit 40 and the information of the communication path of the destination reported by the priority control unit 20 or the load balancing control unit 30, the packet transfer control unit 3 transmits the received packet 2 to one of the data buffers (4-1 to 4-M) that corresponds to the communication path. At this time, if there are several function numbers reported by the function transfer control unit 40, overlapping sections of the packets in question are duplicated and transmitted to the respective data buffer.

<Operation of the Network Load Balancing Apparatus>

Figure 2:
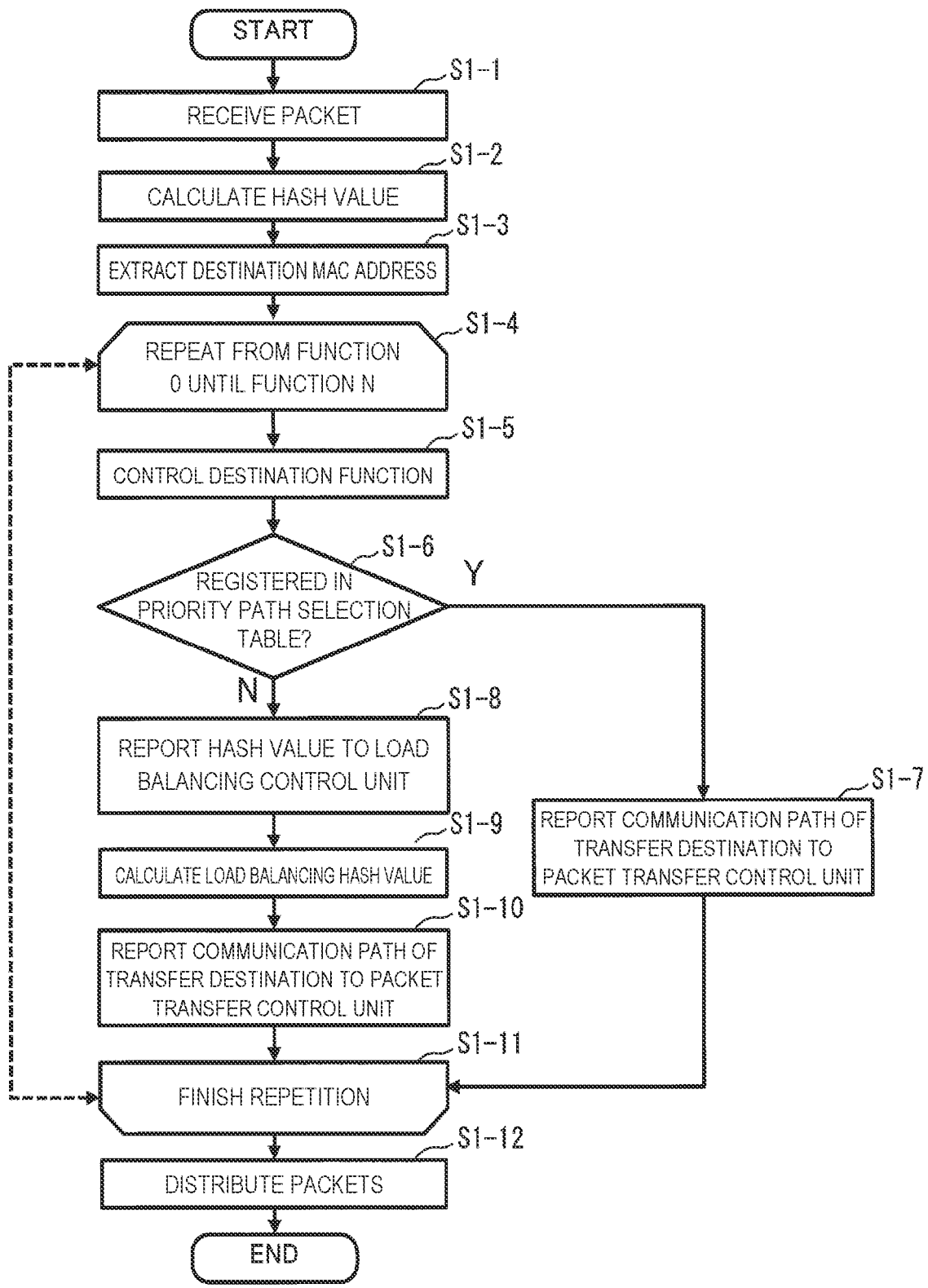
FIG. 2 is a flowchart showing an operation example of a network load balancing apparatus according to an embodiment of the present invention.

FIG. 2 is a flowchart showing an operation example of the network load balancing apparatus according to an embodiment of the present invention. The network load balancing apparatus receives a packet (S1-1), calculates a hash value using a field value of the received packet (S1-2), extracts a destination MAC address contained in the received packet (S1-3), and performs destination function control to determine a destination virtual function of the received packet based on the MAC address of the packet (S1-4, S1-5).

In the operation example shown in FIG. 2, the hash value calculation is performed between receipt of the packet and extraction of the destination MAC address, but the invention is not so limited. Hash value calculation may be performed before the destination function control, or before checking the priority path selection table. By calculating the hash value before the destination function control or before checking the priority path selection table, the conditions of the hash value calculation can be changed for each destination virtual function.

Figure 3:
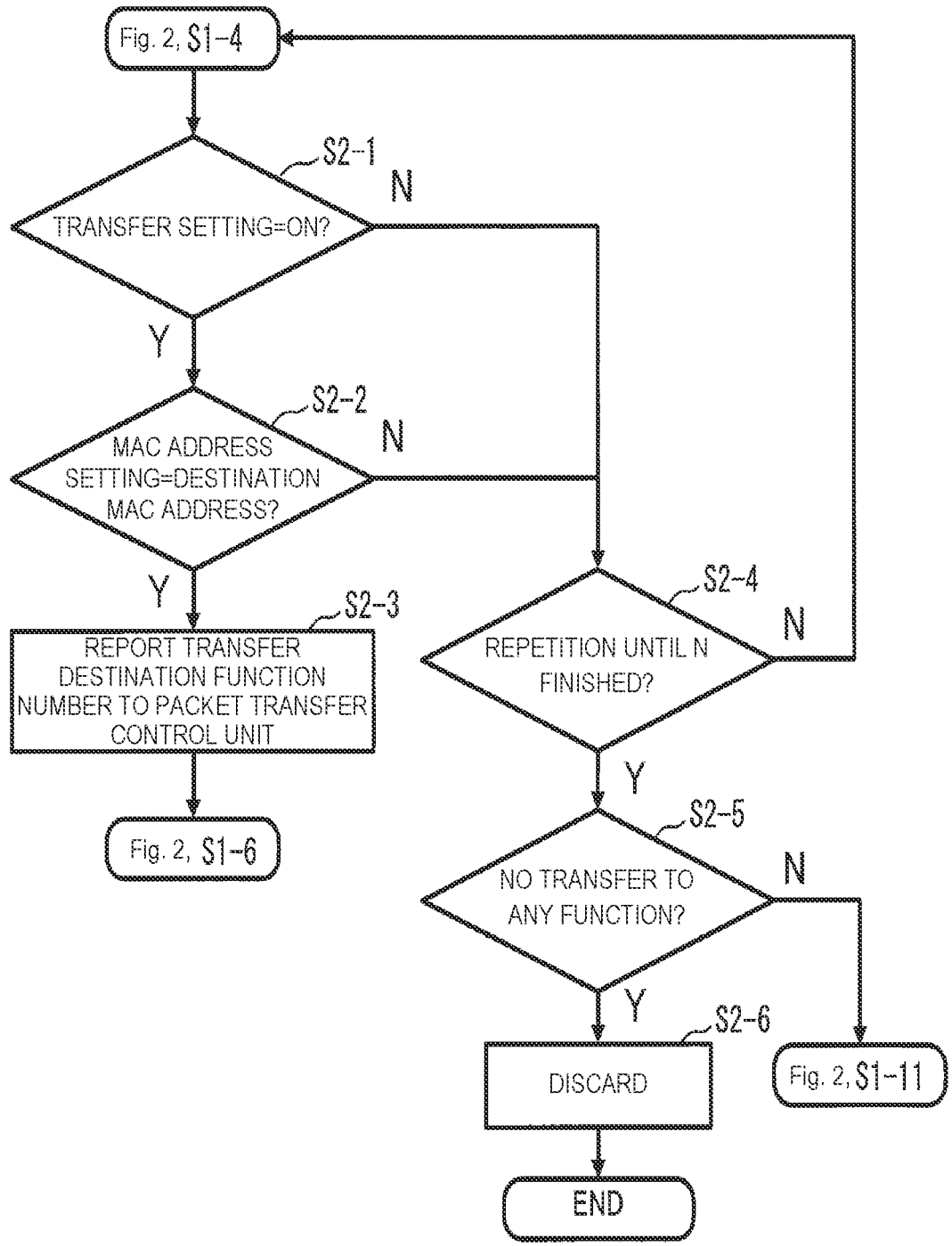
FIG. 3 is a flowchart showing an operation example of a network load balancing apparatus according to a first embodiment of the present invention.

FIG. 3 is a flowchart showing an operation example of a network load balancing apparatus according to a first embodiment of the present invention. In FIG. 3, the function number corresponding to the destination MAC address is looked up by repeating a process of determining a destination virtual function corresponding to the destination MAC address of the received packet for each virtual function (function number=0 to N).

The destination function control unit checks whether the transfer setting of the destination function table is set to ON (S2-1). If the transfer setting is set to ON, the extracted destination MAC address is checked against the MAC address registered in the destination function table to see if they match (S2-2), and in case they match, the corresponding function number is reported to the packet transfer control unit to transfer the received packet to the corresponding virtual function (S2-3). Then, the processing flow shifts to a process for selecting priority control transfer or load balancing control transfer in FIG. 2 (S1-6).

On the other hand, in case the transfer setting is set to OFF or the extracted destination MAC address does not match the registered destination MAC address, the function number of the current virtual function subject to processing is checked (S2-4), and in case the function number of the virtual function has not reached N, the packet is not transferred to the virtual function in question, and it is checked whether the packet is to be transferred to the next virtual function. In case the virtual functions have reached N, it is checked whether packet transfer is not to be made to any of the virtual functions (S2-5), and in case no packet transfer is to be made to any of the virtual functions, the received packet is discarded and the process finishes (S2-6). On the other hand, if there exists even one virtual function to which transfer is to be made, the processing flow shifts to the repetition finish process of FIG. 2 (S1-11), and a packet distribution process (S1-12) is executed.

In FIG. 2, in case it has been determined that the received packet is to be transferred to the virtual function in question, priority control transfer or load balancing control transfer is selected, and a process of reporting the communication path of the destination to the packet transfer control unit is executed.

The priority control unit checks the hash value calculated by the hash value calculation unit against the priority path selection table (S1-6). In case a value identical to the hash value calculated by the hash value calculation unit is registered in the priority path selection table, the priority control unit acquires information of a communication path of a destination corresponding to this hash value from the priority path selection table and reports the information to the packet transfer control unit (S1-7). In case a value identical to the hash value calculated by the hash value calculation unit is not registered in the priority path selection table, the hash value is reported to the load balancing control unit to perform load balancing (S1-8).

The load balancing control unit calculates a hash value used in a load balancing process from the hash value calculated by the hash value calculation unit and information of specific destinations usable in load balancing control (S1-9). Specifically, the hash value calculated by the hash value calculation unit may be divided by the number of communication paths of data buffers usable in load balance control (for each virtual function, the total number of data buffers minus the number of data buffers used in priority control).

As described above, the hash value calculated by the hash value calculation unit is a value unique to the attribute of a packet. On the other hand, the hash value calculated by the load balancing hash value calculation unit is not necessarily a value unique to the attribute of a packet, and there may be a case in which identical values are calculated for different attributes.

The load balancing control unit checks the calculated hash value against the load balancing path selection table, acquires information of a communication path of a destination corresponding to the calculated hash value from the load balancing path selection table, and reports the information of the communication path of the destination to the packet transfer control unit (S1-10).

In accordance with the transfer destination function number determined by the function transfer control unit and the information of the communication path of the destination reported by the priority control unit or the load balancing control unit, the packet transfer control unit transmits the received packet to a corresponding data buffer to perform packet distribution (S1-12). At this time, if there are several function numbers reported by the function transfer control unit, the plurality of packets in question may be duplicated and transmitted to the respective data buffers.

Thus, the present embodiment enables high-speed transfer of received packets while allocating a method of distribution by priority control, a method of distribution by load balancing control, or a mixture of priority control and load balancing control with respect to any virtual function by the settings of the destination function selection table, the priority path selection table, and the load balancing path selection table, allows for changing of the distribution control method of packets to each VM while maintaining a high throughput of the VNFs, and realizes high functionality and high throughput of the system as a whole.

Further, in the present embodiment, distribution to virtual functions is performed based on the MAC address, which is a field value of the received packet, but the invention is not so limited. For example, distribution may be performed based on the IP address, which is a field value of the received packet, or distribution may be performed based on a hash value calculated using the field value of the received packet. In case distribution is performed using a hash value, the hash value calculated by the hash value calculation unit 10 may be used, or the hash value may be calculated by the function transfer control unit.

Further, in the present embodiment, a hash value is calculated by the load balancing hash value calculation unit of the load balancing control unit 30, but calculation of a hash value by the load balancing hash value calculation unit may be omitted, and the hash value reported by the priority path control unit of the priority control unit 20 may be used in load balancing control as is.

Second Embodiment

Figure 4:
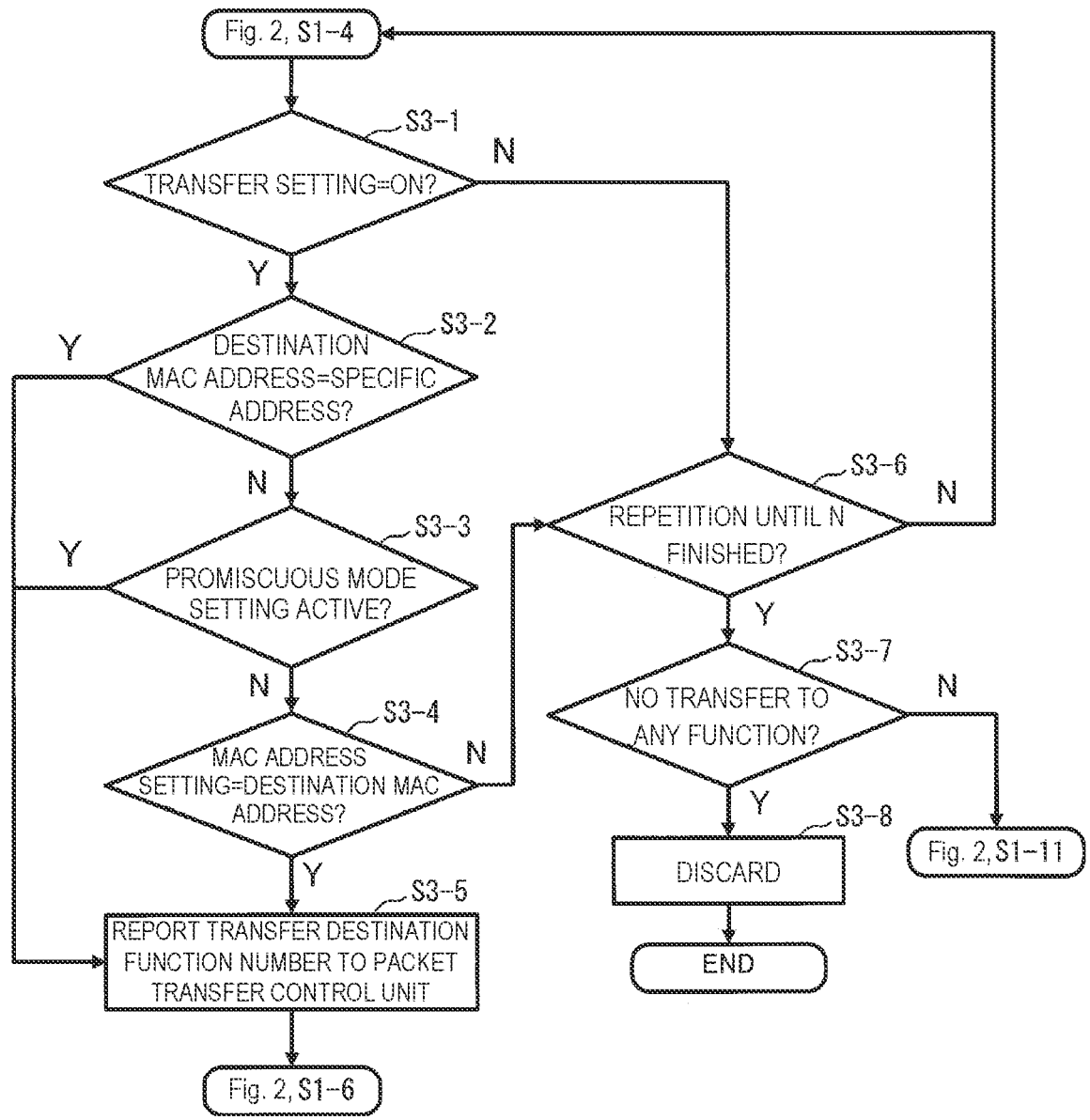
FIG. 4 is a flowchart showing an operation example of a network load balancing apparatus according to a second embodiment of the present invention.
Figure 5:
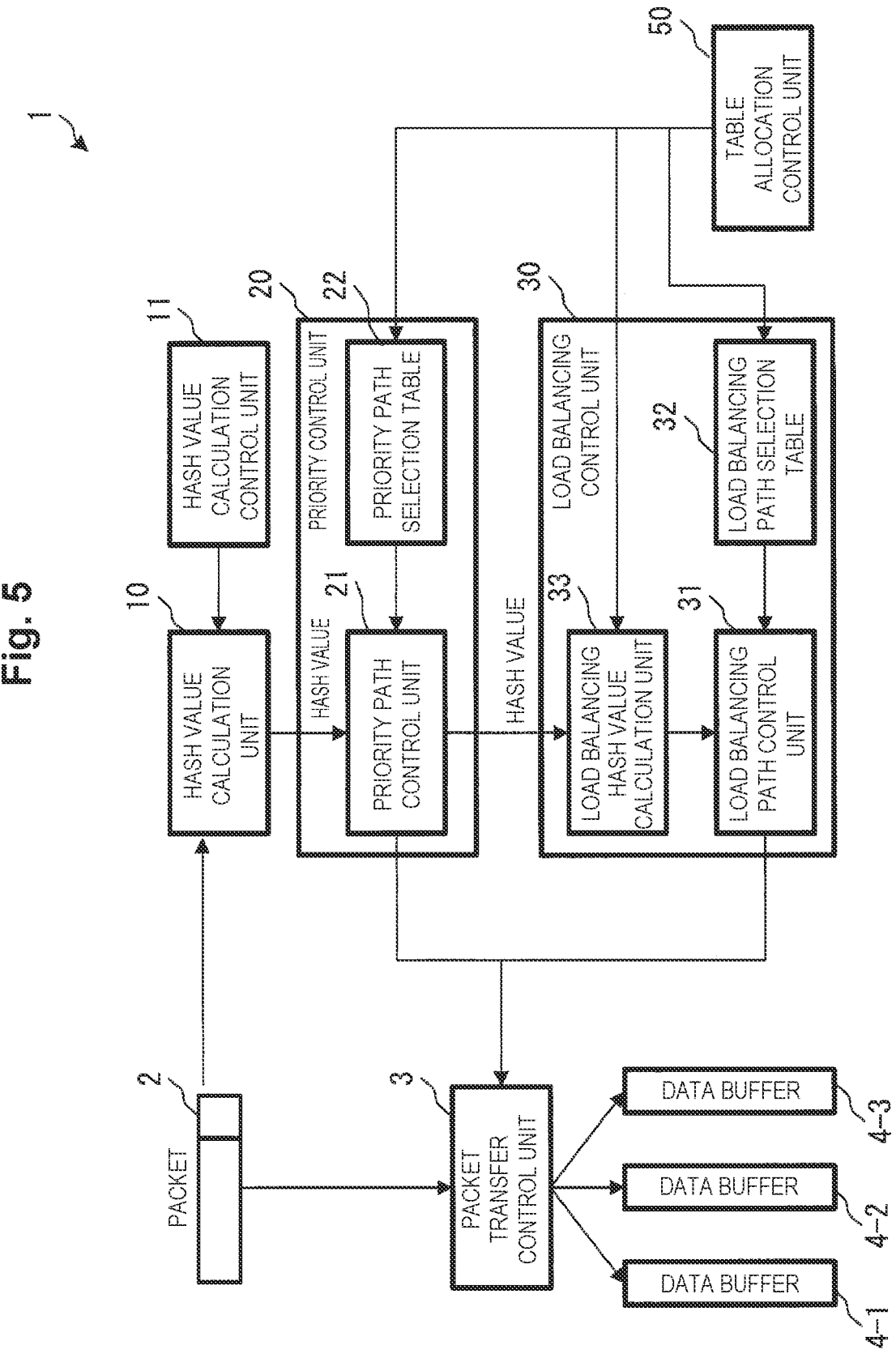
FIG. 5 is a block diagram showing a configuration example of a conventional network load balancing apparatus.

In a second embodiment, in addition to the operation of the first embodiment, received packets are duplicated and transferred to a plurality of virtual functions in a broadcast transfer or promiscuous mode transfer. FIG. 4 is a flowchart showing an operation example of a network load balancing apparatus according to the second embodiment of the present invention. It should be noted that the basic processing flow after receiving a packet in the second embodiment is identical to that of the first embodiment (FIG. 2), but that the destination function control process is different.

In FIG. 4, if the result of the check of the destination function selection table by the function transfer control unit (S3-1) is that the transfer setting is set to ON, the function transfer control unit determines whether the extracted destination MAC address is a specific address (S3-2). A "specific address" is, for example, a broadcast address of all 1's. In case the destination MAC address is a broadcast address of all 1's, the received packet is considered to be a broadcast packet, and information of a function number to the effect that the received packet is to be transferred to the virtual function in question is reported to the packet transfer control unit (S3-5).

On the other hand, if the MAC address extracted from the received packet is not the specific address, the current virtual function subject to processing is checked to see whether a promiscuous mode setting is active (S3-3). In case the promiscuous mode setting is active, the virtual function in question is considered to be a virtual function to receive all packets regardless of the destination MAC addresses of the input packets, and information of a function number to the effect that transfer should be made to the virtual function in question is reported to the packet transfer control unit (S3-5). On the other hand, in case the promiscuous mode setting is inactive, the processing flow subsequently proceeds similarly to that of the first embodiment (S3-4 to S3-8).

Here, whether the promiscuous mode setting is active or inactive may be determined, for example, based on numerical information indicating the active/inactive status of each virtual function stored in the destination function selection table, or based on whether the MAC address of the destination virtual function stored in the destination function selection table is a specific address (for example, an all 0's address that is not normally used) indicating a promiscuous mode, but the invention is not so limited, and other methods may be used.

If numerical information indicating the active/inactive status of each virtual function stored in the destination function selection table is used to determine whether the promiscuous mode setting is active or inactive, then, for example, it is determined that if the numerical information is 00 (and 01) in binary notation, the transfer setting is OFF (and the promiscuous mode is also inactive); if it is 10, the transfer setting is ON but the promiscuous mode is inactive; and if it is 11, the transfer setting is ON and the promiscuous mode is also active.

Thus, the present embodiment, in addition to the operation of the first embodiment, includes functions for dealing with broadcast packets and for duplicating and transferring any packet to any function, and can therefore provide a network load balancing apparatus that allows for more advanced packet distribution processing.

Further, in the present embodiment, it has been described that the destination MAC address of a received packet is used when determining whether to duplicate and transfer the received packet, but the invention is not so limited. For example, the IP address of the received packet may be used to determine whether to duplicate and transfer. A portion of the destination address may also be masked, so that only a portion of the destination address is used in the determination.

The network load balancing apparatus according to the embodiments of the present invention may be a circuit, or a device. Although the network load balancing apparatus shown in the embodiments of the present invention is the best embodiment with a configuration including a priority control processing function that realizes a QoS function and a load balancing processing function that realizes a high throughput, the network load balancing apparatus may also be realized as firmware stored in a ROM and hardware such as a reconfigurable device, element, substrate, wiring, etc. Further, the network load balancing apparatus according to embodiments of the present invention may be configured by a combination of software and hardware, and further as a combination with firmware.

Here, the firmware and software is stored as a program on a recordable medium such as a magnetic disk, a flexible disk, an optical disc, a compact disc, a minidisc, a DVD, etc. The program is read and executed by a CPU. The program causes a computer to function as the network load balancing apparatus according to embodiments of the present invention, or causes the computer to execute the steps of the network load balancing apparatus.

INDUSTRIAL APPLICABILITY

Embodiments of the present invention can be applied to packet destination control implemented on low-resource hardware.

REFERENCE SIGNS LIST

1 Network load balancing apparatus
2 Packet
3 Packet transfer control unit
4-1 to 4-M Data buffer
10 Hash value calculation unit
11 Hash value calculation control unit
20 Priority control unit
21 Priority path control unit
22 Priority path selection table
30 Load balancing control unit
31 Load balancing path control unit
32 Load balancing path selection table
33 Load balancing hash value calculation unit
40 Function transfer control unit
41 Destination function control unit
42 Destination function selection table
50 Table allocation control unit

The invention claimed is:
1. A network load balancing apparatus comprising:
a plurality of data buffers, the plurality of data buffers comprising a data buffer for each communication path of each transfer destination of one or more received packets, each data buffer of the plurality of data buffers being associated with only one virtual function of a plurality of virtual functions and only one communication path priority level of a plurality of communication path priority levels;
a function transfer controller configured to determine a destination virtual function based on a field value of a received packet or a hash value calculated using the field value;
a hash value calculator configured to calculate a first hash value using the field value;
a priority controller configured to determine a first communication path of a transfer destination of the received packet when the received packet is to be subject to priority control based on the first hash value, the first communication path corresponding to a first data buffer of the plurality of data buffers, and the first data buffer corresponding to a priority communication path and the destination virtual function;
a load balancing controller configured to determine a second communication path of the transfer destination of the received packet when the received packet is to be subject to load balancing control, to match a preset load balancing situation of a second data buffer of the plurality of data buffers, based on the first hash value or a second hash value based on the first hash value, the second communication path corresponding to the second data buffer, and the second data buffer corresponding to a load balancing communication path and the destination virtual function; and
a packet transfer controller that, in accordance with the destination virtual function and the first or second communication path of the transfer destination, is configured to transmit the received packet to the first data buffer corresponding to the destination virtual function and the first communication path or to the second data buffer corresponding to the destination virtual function and the second communication path.

2. The network load balancing apparatus according to claim 1, wherein the function transfer controller comprises:
a destination function selection table configured to store in advance, for each of the plurality of virtual functions, a field value of a respective destination virtual function or a hash value calculated using the field value; and
a destination function controller that, for each of the plurality of virtual functions, is configured to check the field value of the received packet against the field value of the destination function selection table, or check the hash value calculated using the field value of the received packet against the hash value of the destination function selection table, and determine the destination virtual function according to a result of the check.

3. The network load balancing apparatus according to claim 1, wherein the function transfer controller is configured to determine all virtual functions of the plurality of virtual functions as destination virtual functions when the field value of the received packet or the hash value calculated using the field value is a value corresponding to a preset specific broadcast address.

4. The network load balancing apparatus according to claim 1, wherein the function transfer controller is configured to determine, for each of the plurality of virtual functions, whether a promiscuous mode is set, and determine one or more first virtual functions of the plurality of virtual functions where the promiscuous mode is set as destination virtual functions to which all packets are to be transferred.

5. A network load balancing method performed by a network load balancing apparatus, the network load balancing method comprising:
a packet receiving step of receiving one or more packets, wherein the network load balancing apparatus comprises a plurality of data buffers, the plurality of data buffers comprises a data buffer for each communication path of each transfer destination of the one or more packets, and each data buffer of the plurality of data buffers being associated with only one virtual function of a plurality of virtual functions and only one communication path priority level of a plurality of communication path priority levels;

a function transfer control step of determining a destination virtual function based on a field value contained in a received packet or a hash value calculated using the field value;

a hash value calculation step of calculating a first hash value using the field value;

a priority control step of determining a first communication path of a transfer destination of the received packet when the received packet is to be subject to priority control based on the first hash value, the first communication path corresponding to a first data buffer of the plurality of data buffers, and the first data buffer corresponding to a priority communication path and the destination virtual function;

a load balancing control step of determining a second communication path of the transfer destination of the received packet when the received packet is to be subject to load balancing control, to match a preset load balancing situation of a second data buffer of the plurality of data buffers, based on the first hash value or a second hash value based on the first hash value, the second communication path corresponding to the second data buffer, and the second data buffer corresponding to a load balancing communication path and the destination virtual function; and a packet transfer control step of, in accordance with the destination virtual function determined in the function transfer control step and the first or the second communication path of the transfer destination determined in at least one of the priority control step or the load balancing control step, transmitting the received packet to the first data buffer corresponding to the destination virtual function and the first communication path or to the second data buffer corresponding to the destination virtual function and the second communication path.

6. The network load balancing method according to claim 5, wherein the function transfer control step comprises:

a step of checking a destination function selection table storing in advance, for each of plurality of the virtual functions, a field value of a respective destination virtual function or a hash value calculated using the field value; and a step of checking, for each of the plurality of virtual functions, the field value of the received packet against the field value of the destination function selection table, or checking the hash value calculated using the field value of the received packet against the hash value of the destination function selection table, and determining the destination virtual function according to a result of the check.

7. The network load balancing method according to claim 5, wherein the function transfer control step determines all virtual functions of plurality of virtual functions as destination virtual functions when the field value of the received packet or the hash value calculated using the field value is a value corresponding to a preset specific broadcast address.

8. The network load balancing method according to claim 5, further comprising receiving a plurality of packets, wherein the function transfer control step determines, for each of the plurality of virtual functions, whether a promiscuous mode is set, and determines one or more first virtual functions of the plurality of virtual functions where the promiscuous mode is set as destination virtual functions to which all packets of the plurality of packets are to be transferred.

* * * * *